United States Patent
Pequignot et al.

(10) Patent No.: US 8,783,716 B1
(45) Date of Patent: Jul. 22, 2014

(54) PIVOT FOOT FOR TRAILER JACK

(71) Applicant: Atwood Mobile Products, LLC, Elkhart, IN (US)

(72) Inventors: Michael James Pequignot, Fremont, IN (US); Nalinikanth Garikapati, Secunderabad (IN); Srirama Raju Pinnamraju, Secunderabad (IN)

(73) Assignee: Atwood Mobile Products, LLC, Elkhart, IN (US)

( * ) Notice: Subject to any disclaimer, the term of this patent is extended or adjusted under 35 U.S.C. 154(b) by 0 days.

(21) Appl. No.: 13/815,600

(22) Filed: Mar. 12, 2013

Related U.S. Application Data (60) Provisional application No. 61/611,107, filed on Mar. 15, 2012.

(51) Int. Cl.
*B60S 9/02* (2006.01)
*B60S 9/04* (2006.01)

(52) U.S. Cl.
CPC .................................. *B60S 9/04* (2013.01)
USPC ............................. 280/764.1; 280/763.1

(58) Field of Classification Search
USPC ............ 280/763.1, 764.1, 765.1, 766.1; 212/301, 302, 303, 304, 305, 306; 254/418, 419, 420
See application file for complete search history.

(56) References Cited

U.S. PATENT DOCUMENTS

| | | | | |
|---|---|---|---|---|
| 3,614,064 | A | * | 10/1971 | Bennett .......................... 254/418 |
| 3,944,259 | A | * | 3/1976 | Miller ............................ 280/475 |
| 4,662,610 | A | * | 5/1987 | Cofer ............................. 254/420 |
| 5,137,301 | A | * | 8/1992 | Muller et al. ............... 280/766.1 |
| 6,726,236 | B2 | * | 4/2004 | Cofer ............................. 280/475 |
| 2006/0214147 | A1 | * | 9/2006 | Meissner ....................... 254/420 |
| 2009/0236577 | A1 | * | 9/2009 | Pollock et al. ................ 254/418 |
| 2011/0215286 | A1 | | 9/2011 | Harper |

\* cited by examiner

*Primary Examiner* — Frank Vanaman
(74) *Attorney, Agent, or Firm* — Michael A. Myers (57) ABSTRACT

An improved pivot foot for a trailer jack of the type having a housing and a telescoping member that can be raised and lowered in and out of the housing eliminates the need for use of blocks between the jack and ground surface. The pivot foot includes a base and a pair of opposite sidewalls upstanding from the base. Each of the sidewalls has a cam slot and an ear slot formed in it. A bridge tab extends between the sidewalls for supporting the jack. A bore extends through the telescoping member of the jack. A pivot ring is provided, and it has a pair of outwardly extending ears. The pivot ring is sized to move freely along the length of the telescoping member. A cam pin extends transversely through the bore of the telescoping member and connects the sidewalls and the jack. The shaft of the cam pin travels within the cam slots to lift and rotate the foot assembly at a pivot defined by the ears of the pivot ring when the telescoping member is raised into the housing of the jack. As a result, the hitch end of the trailer set up is more stable and easier to set up.

4 Claims, 5 Drawing Sheets

PIVOT FOOT FOR TRAILER JACK

REFERENCE TO RELATED APPLICATION

This application claims priority to U.S. Provisional Application No. 61/611,107, filed Mar. 15, 2012, which is hereby incorporated by reference.

BACKGROUND OF THE INVENTION

The invention relates generally to trailer jacks and, more particularly, to a pivot foot for a trailer jack.

Trailer jacks are located at the front hitch portion of the trailer frame where the towing vehicle attaches. A crank allows the jack tube to be raised and lowered between a lowered parking or supporting position and a raised traveling position. Most jack designs are configured so that a tube or pipe that telescopes in and out of the trailer frame is lowered onto the ground surface thus lifting the trailer frame from the hitch. The ball and socket hitch is an example.

An important part of the unhitching of the trailer includes securing the trailer so it does not move once the vehicle is unattached. If it is necessary to use all or nearly all of the length of the pipe to contact the ground, the trailer becomes unsteady. It is common, therefore, to place wooden or cement blocks between the ground and the end of the pipe. This helps lower the center of gravity of the set up while making it easier for the user. He doesn't have to crank the jack down as far from the tongue, which improves the speed and ease with which the jack can be set up.

The jack set up also impacts the attitude of the trailer. A level dwelling structure is preferred, and the jack plays a central role in this function as well. One prior jack foot disclosed in US 2011/0215286 pivots to provide a quicker set up. This device, however, has a bolt slot, a striker plate and a support that share in bearing the weight of the trailer. If the full tongue weight is placed on the jack with the jack foot out of position, which happens frequently during loading and unloading when the trailer is made to rock back and forth in the direction of travel, the inner jack tube can bend, resulting in improper function of the jack or jack foot.

Thus, it would be advantageous to provide an improved pivot foot for a trailer jack. It would be advantageous if such a device was sturdy, convenient, and did not interfere with the free travel of the vehicle and trailer.

SUMMARY OF THE INVENTION

The present invention relates to a pivoting foot connected to the end of a jack of the type that includes a housing and a telescoping member that can be raised and lowered in and out of the housing. The pivot foot includes a base and a pair of opposite sidewalls upstanding from the base. Each of the sidewalls has a cam slot and an ear slot formed therein. A bridge tab extends between the sidewalls for supporting the jack. A bore extends through the telescoping member of the jack. A pivot ring with a pair of outwardly extending ears is provided that has an inner diameter larger than the diameter of the telescoping member so that the pivot ring may encircle the telescoping member and move freely along the length of the member. A cam pin with a shaft and opposite ends extends transversely through the bore of the telescoping member and connects the sidewalls and the jack. The shaft of the cam pin has an outer diameter smaller than the cam slot so that the shaft slides within the cam slots to lift and rotate the foot assembly at a pivot defined by the ears of the pivot ring when the telescoping member is raised into the housing of the jack.

In another aspect of the invention, each of the cam slots includes a straight portion and a curved portion.

In another aspect, each of the ear slots has a horizontal portion with an open back and a vertical portion with a top and a bottom. The ears contact the bottom of the vertical portion when the pivot foot is lifted and rotated from the vertical supporting position to the horizontal traveling position.

In still another aspect, a front wall connects the opposite sidewalls to define an enclosure.

One object of the invention is to provide an improved foot for a jack, which foot does not require the user to use wooden/cement blocks or unreasonably extend the jack at the front hitch so the trailer becomes top-heavy. Related objects and advantages of the present invention will be apparent from the following description.

BRIEF DESCRIPTION OF THE DRAWINGS

The details of the invention, both as to its structure and operation, may be obtained by a review of the accompanying drawings, in which.

DETAILED DESCRIPTION OF INVENTION

For the purposes of promoting an understanding of the principles of the invention, specific embodiments have been described. It should nevertheless be understood that the description is intended to be illustrative and not restrictive in character, and that no limitation of the scope of the invention is intended. Any alterations and further modifications in the described components, elements, processes, or devices, and any further applications of the principles of the invention as described herein, are contemplated as would normally occur to one skilled in the art to which the invention relates.

Figure 1:
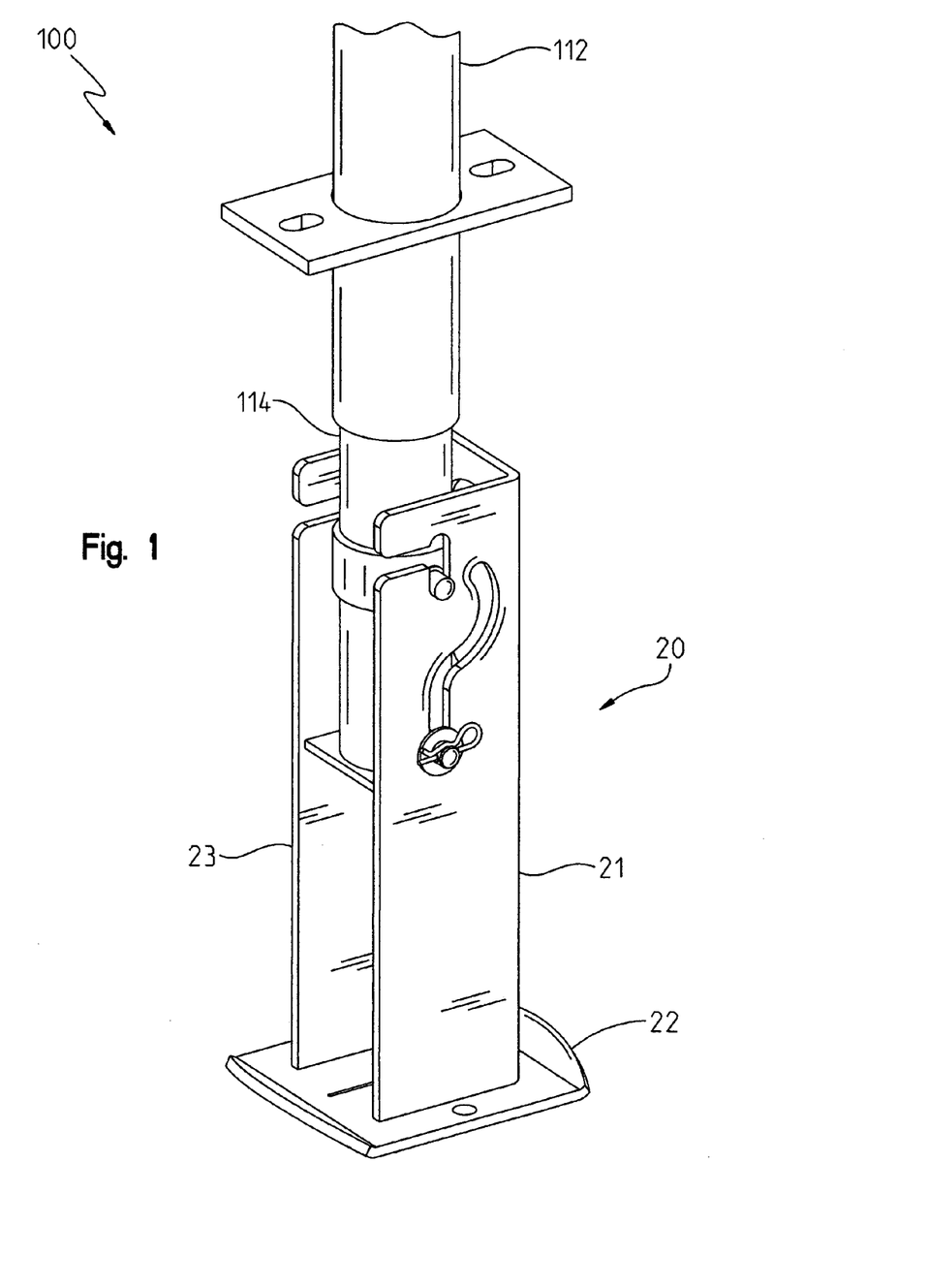
FIG. 1 is an isometric view of the pivot foot of the invention.
Figure 2:
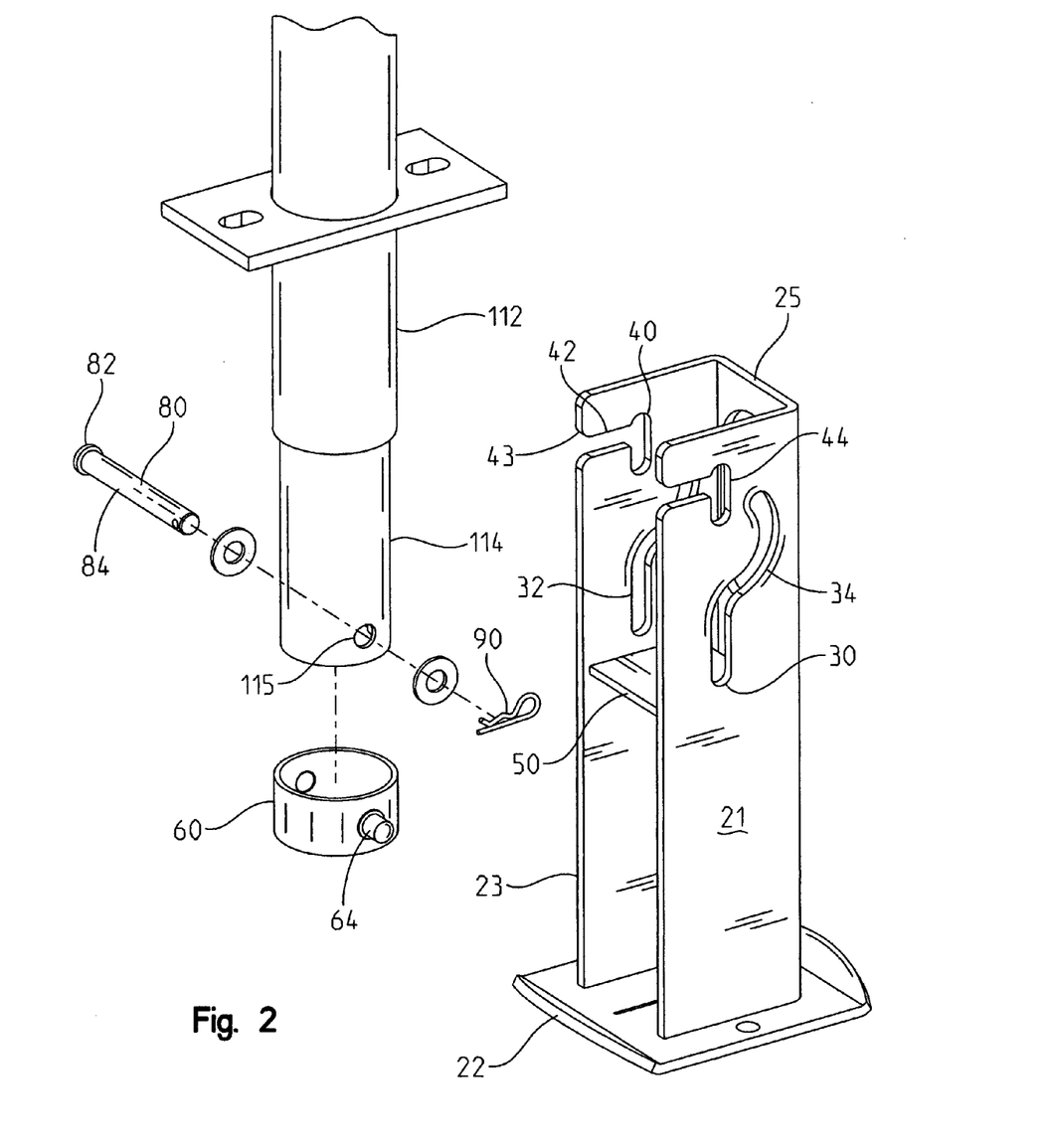
FIG. 2 is an exploded view of the pivot foot.

With reference to FIGS. 1-2, a pivot foot 20 for a jack 100 includes a base 22 and a pair of opposite sidewalls 21, 23 upstanding from the base. Each of the sidewalls has a cam slot 30 and an ear slot 40 cut through the wall. The cam slot is located, generally, in the upper central part of each of the sidewalls and is defined by a lower straight portion 32 and an upper curved portion 34. Each ear slot 40 has a horizontal portion 42 with an open back 43 and a vertical portion 44 having a top 46 and a bottom 48. The portions 32, 42, 34, 44 are cut into and extend through each of the corresponding sidewalls, as illustrated in FIGS. 1 and 2.

At a location approximately one-half their length below the cam slot 30 and ear slot 40, the sidewalls 21, 23 are connected by a flat bridge tab 50 that extends between them. The bridge tab 50 provides a sturdy surface for supporting the jack 100, as best illustrated in FIG. 1. Thus, if the full tongue weight is placed on the jack 100 with the pivot foot 20 out of position, the pivot foot will be made to assume a vertical attitude as the tube engages the tab 50. As a result, the inner jack tube will not bend, and neither will the jack or jack foot fail to operate properly.

Figure 5:
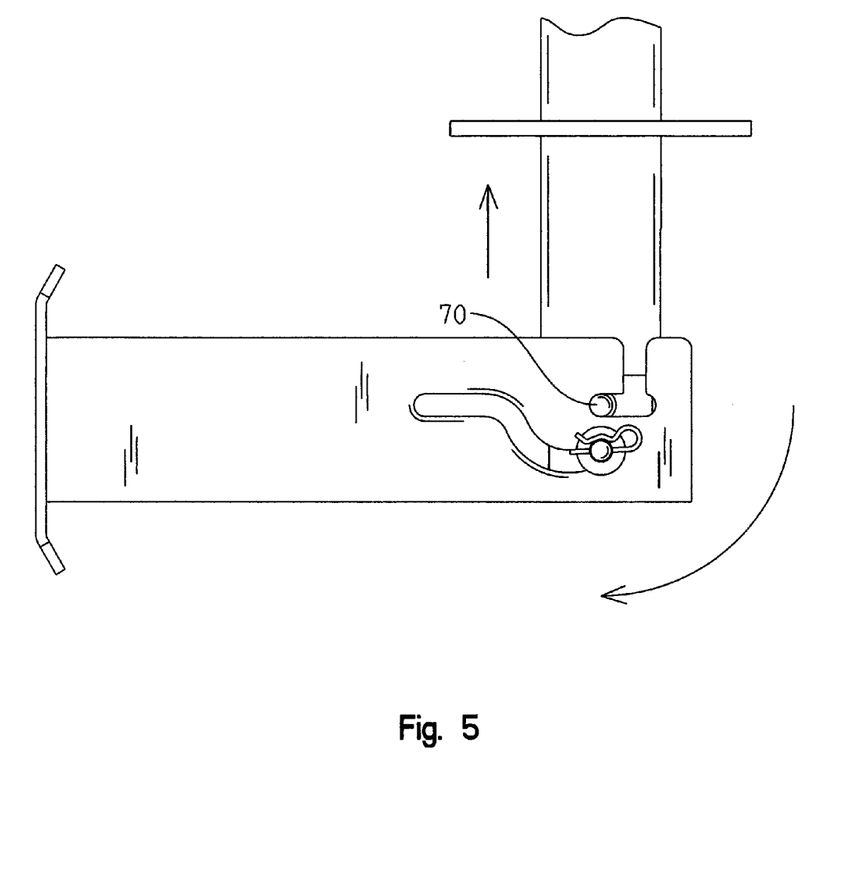
FIG. 5 is a side view of the pivot foot in the horizontal traveling position.

At least one wall connects the opposite side walls to define an enclosure. This connecting wall is, preferably, a front wall 25 so that dirt and debris does not accumulate within the jack foot when it is in the horizontal traveling position, as shown in FIG. 5. In other embodiments, the connecting wall connects the side walls so as to enclose the jack foot from its rear relative to the longitudinal direction of the hitch and trailer or to both the front and rear, thus forming a hollow tubular structure (not shown).

The base 22, opposite walls 21, 23, bridge tab 50 and other components of the pivot foot 20 are formed from a sturdy rigid material, preferably steel.

The jack 100 for which the pivot foot is especially well suited is of the type that includes a housing 112 with a telescoping member 114, as illustrated in the figures. A bore 115 is made to extend through the telescoping member. To assemble the pivot foot 20 of the invention, a cam pin 80 with opposite ends is secured in the bore 115 of the telescoping member 114. One end of the cam pin has a head 82 with an outer diameter. The outer diameter of the head 82 is larger than the cam slot 30 so that the head may not pass freely through the slot. The pin 80 thus connects the sidewalls 21, 23 and the jack 100, as shown in FIGS. 1 and 2. A cotter pin 90 or other means may be used at the other end to removably secure the cam pin 80 in the bore 115. The outer diameter of the shaft 84 of the cam pin 80, however, is smaller than the cam slot 30. The pin 80 is thus able to travel freely through the slot 30 as described below.

Figure 3:
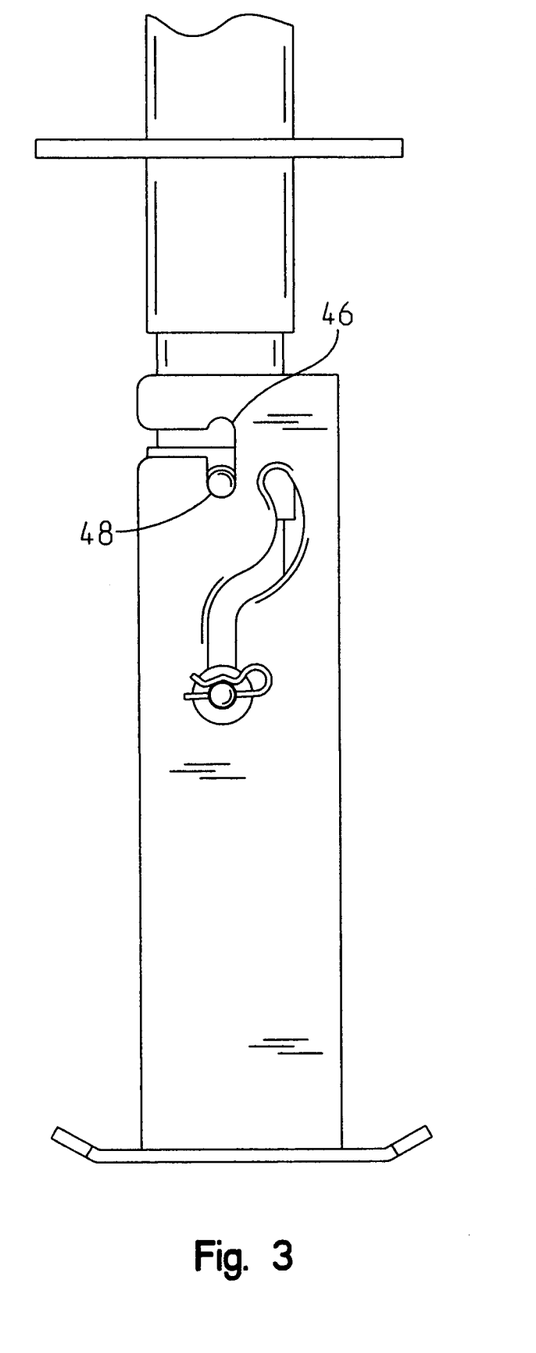
FIG. 3 is a side view of the pivot foot in the vertical supporting position.

A pivot ring 60 is provided for placement around the telescoping member 114 of the jack 100. The inner diameter of the pivot ring 60 is larger than the telescoping pipe or member of a crank type jack so it may encircle the telescoping member 114 and move freely along its length. The pivot ring 60 has a pair of outwardly extending ears 64, which seat against the bottom 48 of the vertical portion 44 of the ear slot 40 when the foot 20 rotates between a vertical supporting position (FIG. 3) and a horizontal traveling position (FIG. 5).

Figure 4:
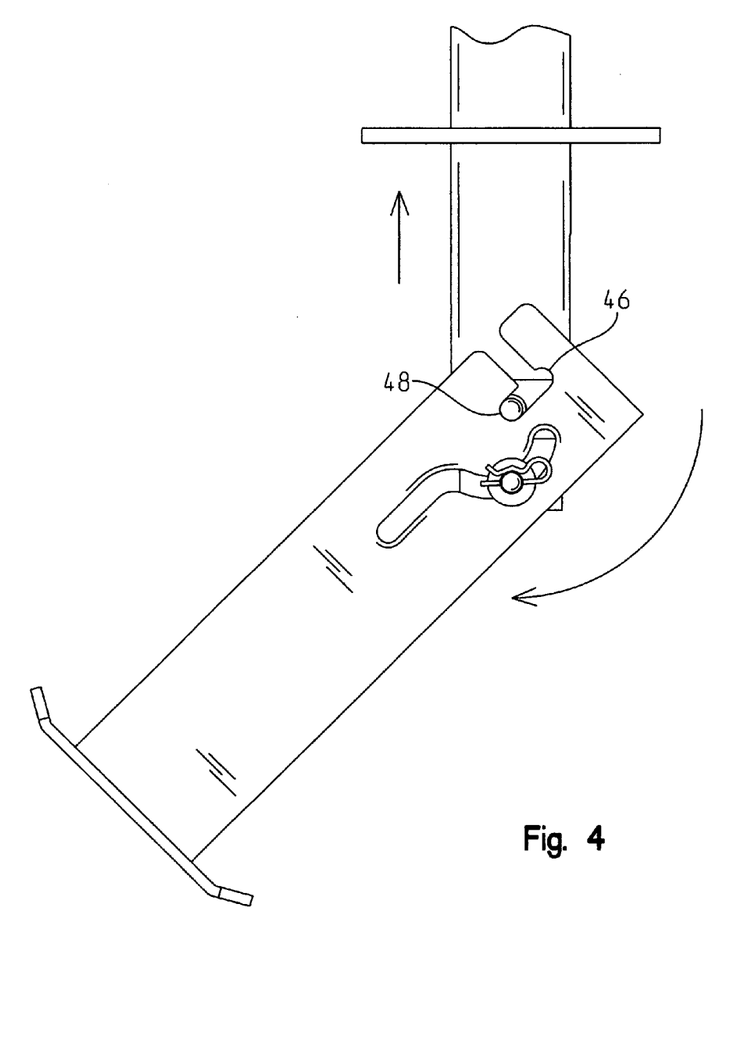
FIG. 4 is a side view of the pivot foot between the supporting position and the horizontal traveling position.

In use, the telescoping member 114 is lowered from inside the jack housing 112 manually using a crank or, in some applications the jack (or leveling system) may operate by electromechanical means. As the telescoping member 114 is lowered from the housing 112, the pin 80 moves within the cam slots 30 in the sidewalls 21, 23 rotating the pivot foot 20 from the horizontal traveling position into the vertical supporting position. The ears 64 of the pivot ring 60 seat in the bottom 48 of the vertical portion 44 of the ear slots 40 in the sidewalls 21, 23. The ears 64 provide a pivot function for the foot 20. Ears 64 do not bear the weight of the trailer (not shown). When the telescoping member 114 is raised, as shown in FIG. 4, the ears 64 remain seated in the bottom 48 maintaining the pivot 70 as the pin moves from the straight portion 32 to the curved portion 34 of the cam slot 30 thus rotating the pivot foot 20 upward into the horizontal traveling position (FIG. 5).

The improved pivot foot 20 eliminates the need for wooden/cement blocks and the jack 100 does not have to be unreasonably extended. As a result, the hitch end of the trailer set up (not shown) has a lower center of gravity improving stability and ease of set up.

While the invention has been illustrated and described in detail in the drawings and foregoing description, the same is to be considered illustrative and not restrictive in character. It is understood that the embodiments have been shown and described in the foregoing specification in satisfaction of the best mode and enablement requirements. It is understood that one of ordinary skill in the art could readily make a nearly infinite number of insubstantial changes and modifications to the above-described embodiments and that it would be impractical to attempt to describe all such embodiment variations in the present specification. Thus, it is understood that it is desirable to protect all the changes and modifications that come within the spirit of the invention.

The invention claimed is:

1. A pivot foot for a jack having a housing and a telescoping member that can be raised and lowered in and out of the housing, the pivot foot comprising:
   a base;
   a pair of opposite sidewalls upstanding from the base, said sidewalk each having a cam slot and an ear slot formed therein;
   a bridge tab extending between the side walls for supporting the jack, a bore extending through the telescoping member of the jack; and
   a pivot ring having a pair of outwardly extending ears, the pivot ring has an inner diameter larger than the diameter of the telescoping member so that the pivot ring may encircle the telescoping member and move freely along the length of said member;
   wherein a cam pin with a shaft and opposite ends extends transversely through the bore of said telescoping member and connects the side walls and the jack, the shaft of the cam pin has an outer diameter smaller than the cam slot, wherein the shaft slides within the cam slots to lift and rotate the foot at a pivot defined by the ears of the pivot ring when the telescoping member is raised into the housing of the jack.

2. The pivot foot of claim 1, wherein each of the cam slots has a straight portion and a curved portion.

3. The pivot foot of claim 1, wherein each of the ear slots has a horizontal portion with an open back and a vertical portion having a top and a bottom,
said ears contacting said bottom of the vertical portion when the pivot foot is lifted and rotated from the vertical supporting position to the horizontal traveling position.

4. The pivot foot of claim 1, wherein a front wall connects the opposite side walls to define an enclosure.

* * * * *

UNITED STATES PATENT AND TRADEMARK OFFICE
CERTIFICATE OF CORRECTION

PATENT NO. : 8,783,716 B1
APPLICATION NO. : 13/815600
DATED : July 22, 2014
INVENTOR(S) : Pequignot et al.

Page 1 of 1

It is certified that error appears in the above-identified patent and that said Letters Patent is hereby corrected as shown below:

In the Claim

Col. 4, claim 1, line 24, replace "sidewalk" with --sidewalls--.

Signed and Sealed this
Fourteenth Day of October, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,783,716 B1 | Page 1 of 1 |
| APPLICATION NO. | : 13/815600 | |
| DATED | : July 22, 2014 | |
| INVENTOR(S) | : Michael James Pequignot et al. | |

It is certified that error appears in the above-identified patent and that said Letters Patent is hereby corrected as shown below:

Title Page, Item (72) Inventors should read:

--(72)  Inventors: Michael James Pequignot, Fremont IN (US); Nalinikanth Garikapati, Secunderabad (IN); Srirama Raju Pinnamraju, Secunderabad (IN); Hari Sunkara, Elkhart (IN)--.

Signed and Sealed this

Nineteenth Day of May, 2015

Michelle K. Lee
*Director of the United States Patent and Trademark Office*

UNITED STATES PATENT AND TRADEMARK OFFICE
CERTIFICATE OF CORRECTION

PATENT NO. : 8,783,716 B1
APPLICATION NO. : 13/815600
DATED : July 22, 2014
INVENTOR(S) : Michael James Pequignot et al.

It is certified that error appears in the above-identified patent and that said Letters Patent is hereby corrected as shown below:

Title Page, Item (72) Inventors should read:

--(72) Inventors: Michael James Pequignot, Fremont IN (US); Nalinikanth Garikapati, Secunderabad (IN); Srirama Raju Pinnamraju, Secunderabad (IN); Hari Sunkara, Elkhart IN (US)--.

This certificate supersedes the Certificate of Correction issued May 19, 2015.

Signed and Sealed this
Twenty-fourth Day of November, 2015

Michelle K. Lee
*Director of the United States Patent and Trademark Office*